(12) United States Patent
Isani et al.

(10) Patent No.: US 7,529,862 B2
(45) Date of Patent: May 5, 2009

(54) SYSTEM FOR PROVIDING ACCESS OF MULTIPLE DATA BUFFERS TO A DATA RETAINING AND PROCESSING DEVICE

(75) Inventors: Soniya T. Isani, Mapusa (IN); Hariharasudhan Kalayamputhur Radhakrishnan, Tamil Nadu (IN)

(73) Assignee: STMicroelectronics PVT. Ltd., Uttar Pradesh (IN)

( * ) Notice: Subject to any disclaimer, the term of this patent is extended or adjusted under 35 U.S.C. 154(b) by 82 days.

(21) Appl. No.: 11/512,750

(22) Filed: Aug. 30, 2006

(65) Prior Publication Data

US 2007/0067544 A1    Mar. 22, 2007

(30) Foreign Application Priority Data

Aug. 31, 2005 (IN) .................. 2330/DEL/2005

(51) Int. Cl.
*G06F 3/00* (2006.01)
(52) U.S. Cl. .............................. 710/9; 710/110; 710/117
(58) Field of Classification Search ................... 710/3, 710/9, 110, 117
See application file for complete search history.

(56) References Cited

U.S. PATENT DOCUMENTS

| 5,636,342 | A | * | 6/1997 | Jeffries ........................ 714/48 |
| 5,898,859 | A | * | 4/1999 | Kardach et al. ............... 703/23 |
| 5,974,475 | A | * | 10/1999 | Day et al. ..................... 710/9 |
| 6,175,887 | B1 | * | 1/2001 | Ervin et al. .................. 710/113 |
| 6,622,188 | B1 | * | 9/2003 | Goodwin et al. ............ 710/105 |
| 6,728,908 | B1 | * | 4/2004 | Fukuhara et al. ............. 714/48 |
| 6,874,052 | B1 | * | 3/2005 | Delmonico ................. 710/305 |
| 6,931,468 | B2 | * | 8/2005 | Smith et al. ................. 710/104 |
| 7,016,993 | B2 | * | 3/2006 | Lee ............................. 710/100 |
| 2002/0108011 | A1 | * | 8/2002 | Tanha ........................ 710/306 |
| 2008/0189459 | A1 | * | 8/2008 | Takeuchi .................... 710/110 |

FOREIGN PATENT DOCUMENTS

EP    996068 A2 *  4/2000
EP    1764703 A1 *  3/2007

OTHER PUBLICATIONS

Fujitsu Limited. MB86291S <Scarlet> I2C Interface Specification. Revision 1.01. Apr. 8, 2001.*
Philips Semiconductors. The I2C-bus and how to use it (including specifications). 1995.*
Texas Instruments. TMS320DM646x DMSoC Inter-Integrated Circuit (I2C) Module. User's Guide. Jun. 2008.*
Philips Smiconductors. The I2C-BUS Specification. Version 2.1. Jan. 2000.*

* cited by examiner

*Primary Examiner*—Paul R Myers
*Assistant Examiner*—Matthew D Spittle

(57) ABSTRACT

An area efficient system that includes a first circuit to synchronize a clock signal and a data signal and a data retaining and processing device to receive data from said data bus to thereby generate a status signal indicating the receipt of data by said area efficient system; a reference bus address and said data bus. The system also includes a device to compare the reference bus address with the content of memory for generating an address matching signal and a control signal generator to govern the data write signal generation for said shifting means. The system further includes a sequencer to read and write data from/to said data retaining and processing device in a plurality of subcycles for efficiently accessing storage buffers and a direct storage access controlling means for generating interrupt signals and access request signals.

17 Claims, 6 Drawing Sheets

SYSTEM FOR PROVIDING ACCESS OF MULTIPLE DATA BUFFERS TO A DATA RETAINING AND PROCESSING DEVICE

TECHNICAL FIELD OF THE INVENTION

The present disclosure relates generally to systems for providing access of multiple data buffers to a data retaining and processing device and, in particular, to a system for providing access of multiple data buffers to a master device by using I2C protocol for data communication.

BACKGROUND OF THE INVENTION

The Peripheral Component Interconnect bus, which is a bus designed by Intel Corporation is a high-speed interface between the central processing unit (CPU) and peripheral devices in a computer system. The bus operates in synchronization with the clock speed of the CPU at 33 Mhz. A customized bus system for a typical high bandwidth server application is a Compact Peripheral Component Interconnect (CPCI) bus.

The CPCI bus is limited to the components that require infrequent access and are subjected to small amount of data transfers, and is therefore not suitable for communication between high-speed integrated circuits.

Conventionally, the Inter Integrated Circuit (I2C) protocol is used for establishing communication among the devices at the integrated circuit level. The I2C bus permits integrated circuits to communicate directly with each other through a bi-directional bus. The device to be connected to the bus is coupled to the serial data (SDA) wire and the serial clock (SCL) wire. The SDA wire is used for the communication of data and the SCL wire is used for control and synchronization of communication of data between the devices. The output of each electronic device is configured as an open-collector/open-drain device, wherein one or more pull-up resistors maintain a logic high value on the bus while the bus is in an inactive state.

The I2C system comprises a plurality of electronic devices connected in parallel to each other and are connected to the SCL and SDA line. If an electronic device requires data from a bus, the electronic device pulls the bus to a logic low value, through the open collector or open drain device that is placed in a conductive state to a ground potential.

U.S. Patent Publication No. 2005/0091438 A1 relates to a system and method that provides an Intelligent Platform Management Interface (IPMI) controller to control various Inter Integrated Circuit (I2C) slave devices having I2C slave drivers without any modification of the I2C slave drivers on the I2C slave devices. The I2C slave devices can be managed without an external and/or a dedicated I2C master controller.

FIG. 1 illustrates a conventional CPCI system 602 as mentioned in the aforementioned patent document, said CPCI system 602 comprising a CPCI backplane or midplane (not shown), a plurality of node cards (or blades) 606, a host node card or master card (MC) 616, a switch card (not shown), power supplies 605, fans 604, and a system control board (SCB) 603. The MC 616 includes a central processing unit (CPU) 608 to provide the on-board intelligence for the MC 616. The CPU 608 of the MC 616 is coupled to memories (not shown) containing a firmware and/or software that runs on the MC 616, IPMI controller 610, and other devices, such as a programmable logic device (PLD) 609 for interfacing an IPMI controller 610 with the CPU 608. The SCB 603 provides the control and status of the system 602, such as monitoring the healthy status of all the power supplies 605 and the fans 604 (FRUs), powering ON and OFF the FRUs, etc.

The SCB 603 is interfaced with the MC 616 via an I2C interface 611 so that the MC 616 can access and control the FRUs in the system 602. The fans 604 provide the cooling to the entire system 602. Each of the fans 604 has a fan board, which provides control, and status information about the fans and, like the SCB 603, are also controlled by the MC 616 through the I2C interface 611. The power supplies 605 provide the required power for the entire system 602. The MC 616 manages the power supplies 605 through the I2C 611 (e.g., the MC 616 determines the status of the power supplies 605 and can power the power supplies 605 ON and OFF). The node cards 606 are independent computing nodes and the MC (which may also be a node card) manages these node cards though the IPMI 612 (or IPMB).

In addition, the IPMI controller 610 has its own processing core unit and runs the IPMI protocol over the IPMB 612 to perform the management of the computing node cards 606. IPMI Controller 610 is also the central unit (or point) for the management of the system 602. The CPU 608 of the MC 616 can control the IPMI controller 610 and retrieve the system 602-status information by interfacing with the IPMI controller 610 via PLD 609. The IPMI controller 610 provides the MC 616 with the IPMB 612 (the IPMB then connects with the "intelligent FRUs," such as node cards and switch fabric card) and the I2C 611 (the I2C interface 611 then connects with the "other FRUs," such as fans, power supplies, and the SCB).

It can be seen from the aforementioned patent document that it is a controller that controls various slaves connected to the master. Thus, the IPMI controller cannot emulate a slave to create a multiple slave control system and adds an area overhead to the system.

Further, there is no mechanism to confirm the validity of the data written to the serial memory. The data has to be read back which is not feasible for time critical applications.

Single I2C interfaces do not have multiple slave addresses mapped to individual reusable buffers. If a single master wants to access multiple data buffers based on the command code communicated, this will increase the software overhead and communication time. Single buffer I2C peripherals increase software overhead due to software processing for each data received on the bus. Byte count and memory pointer are maintained by the software increasing the software overhead.

Thus, a need is felt for an efficient data transference system for integrated circuits that saves on area and is a speed efficient emulation system wherein emulation of the data storage is an integral part of the data accession function.

SUMMARY OF THE INVENTION

To address the above-discussed deficiencies of the prior art, an object of the present invention is to provide an area efficient system for providing serial access of multiple data buffers to a data retaining and processing device.

It is another object of the present disclosure to provide a macro cell within a micro controller, said macro cell comprising an input/output circuit configured for at least three slave devices.

It is yet another object of the present disclosure to emulate serial memory functions.

It is further an object of the present disclosure to control data transference on the bus corresponding to the input clock pulse to thereby avoid drawbacks caused due to clock pulse stretching in accordance with the I2C bus standards.

To achieve the aforementioned objectives, one embodiment of the present disclosure provides an area efficient system for providing serial access of multiple data buffers to a data retaining and processing device, such as CPU 608 through an IPMI controller 610, as described above. The system includes a signal synchronization and detection means, such as data control 212 and detection of bus conditions 214 (a data bus operations detector), and such as I2C_BUSIN 302 and I2C_BUSOUT 322, which together comprise a data bus operations detector, filter 304 and filter 306, for synchronizing a clock signal. The system also includes a data signal, said data signal being effectuated by said clock signal for generating status signals and data bus. The system further includes a shifting means, such as shift register 216, for receiving and retaining data received from said data bus and to generate, for example: (1) a status signal indicating the receipt of data by said area efficient system; (2) a reference bus address; and (3) data for enabling direct storage access. They system still further includes a comparing means, such as comparator 218, operably coupled to at least three storage means, such as slave address #1 202, slave address #2 204, and slave address #3 208 in memory 208, for comparing said reference bus address with the content of said storage means to generate an address matching signal. The system additionally includes a control signal generation means, such as data registers 222, for generating control signals to govern the data write signal generation for said shifting means responsive to said data bus.

The system may also include a sequencing means, such as sequencer 200, for reading data from said data retaining and processing device and writing data to the data retaining and processing device in a plurality of subcycles responsive to said status signals, data bus, control signals and said reference bus address, said plurality of subcycles including, for example, (1) accessing storage buffers of said data storage and processing device; said storage buffers corresponding to the value stored in said registers; (2) accessing data pages from said storage buffers corresponding to the output provided by said control signal generation means; (3) generating a data page rollover output if data transfer does not confirm to data page length; and (4) providing sequential read access responsive to the access of fist data page to thereby provide time efficient address decoding. The system still further includes a direct storage access controller operably coupled to at least three address registers for enabling data read and write operation of the data retaining and processing device, receiving signals from said shifting means for enabling speed efficient access of said data bus to said data retaining and processing device and receiving control signal from said sequencing means for generating interrupt signals and access request signals for said retaining and processing device. Finally, the said serial access of multiple data buffers may be effectuated by using the inter-integrated circuit data transfer protocol.

The present disclosure further provides a microcontroller containing a plurality of macrocells, as described above.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure will now be described with the help of accompanying drawings, in which like reference numerals represent like parts, and in which.

DETAILED DESCRIPTION

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged data transference system.

Figure 1:
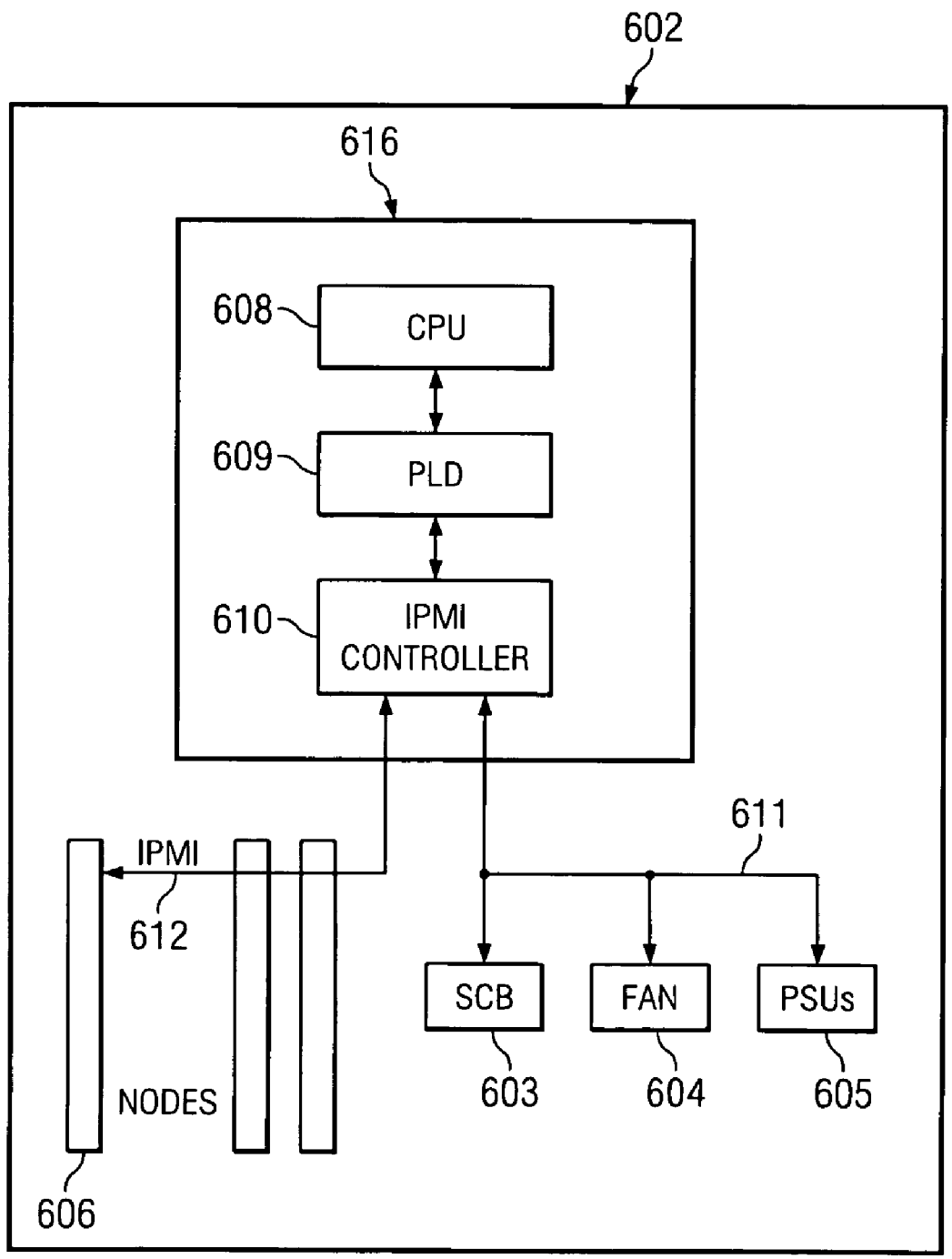
FIG. 1 illustrates a conventional I2C controller interface for I2C devices.
Figure 2:
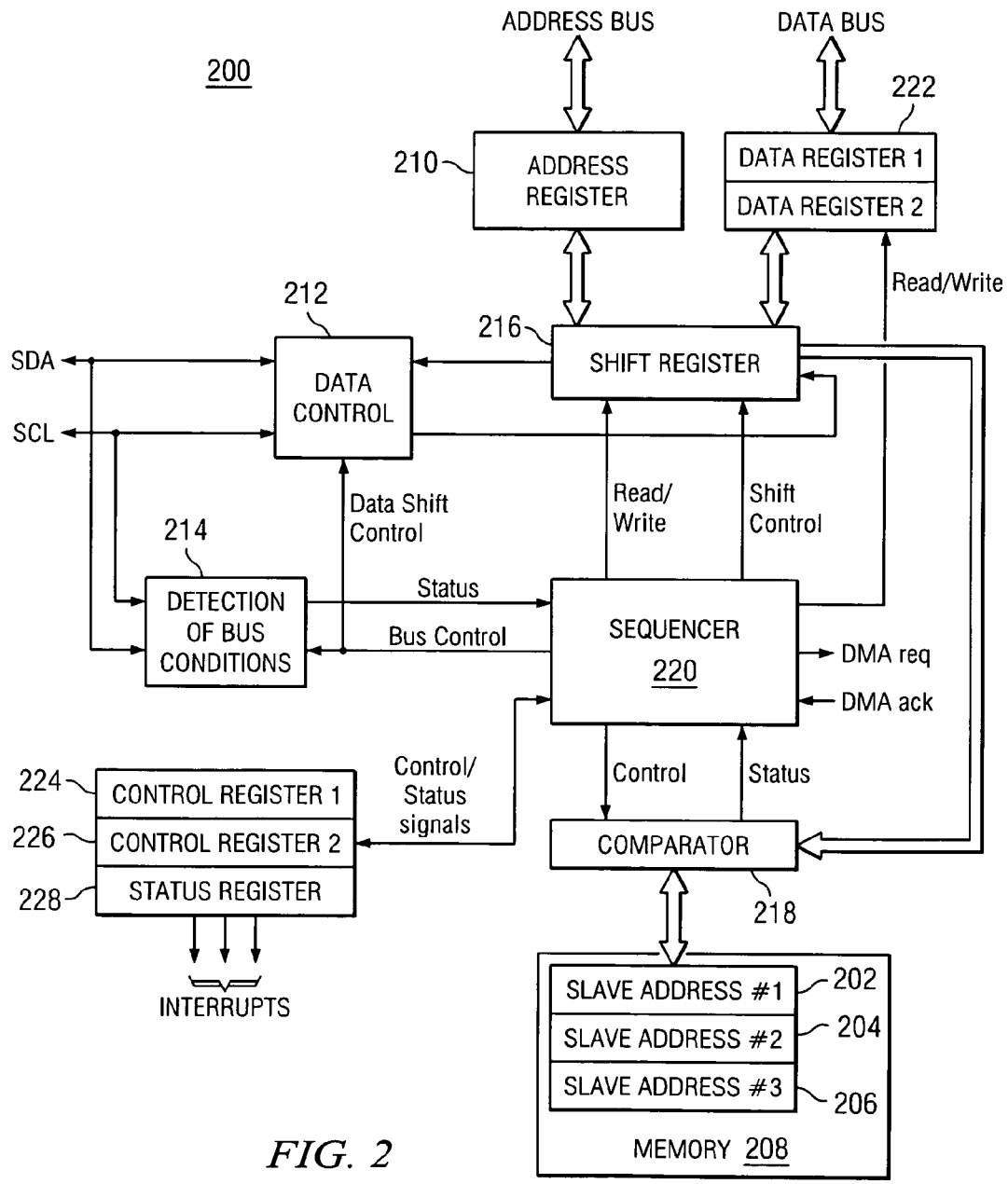
FIG. 2 illustrates the functional block diagram of the macrocell that includes three slave addresses and control logic interfaced with the I2C bus in accordance with one embodiment of the present disclosure.

Referring to FIG. 2, there is depicted an area efficient system 200 that is a slave only I2C cell supporting Standard mode and Fast mode of communication on the I2C bus. It consists of three user configurable, independent slave addresses (SLAVE ADDRESS#1 202, SLAVE ADDRESS #2 204, SLAVE ADDRESS #3 206) that can be individually enabled. All three addresses have dedicated area in the Random Access Memory 208 (RAM), that is a configuration of 3×256 and use a Direct Memory Access (DMA) device to write/read (DMA req, DMA ack, Read/Write) from the RAM. The three slave addresses are capable of producing an interrupt to the CPU after a write/read operation.

Features for full-speed emulation of conventional serial memory devices as the ST M24Cxx and AT24Cxx micro controller family are provided by the instant disclosure and it supports the following operations of the memory systems:
Byte Write
Page write
Current Address Read
Random Read
Sequential Read
Combined Format
Configurable write protection for each slave
Programmable page size (8/16 bytes) or full buffer
No clock stretching The three slave addresses can be used as general-purpose I2C slaves. The third slave (SLAVE ADDRESS #3) can be used to allow the addressing master to send data bytes as commands to the micro controller. These commands can be decoded by the firmware to perform various operations such as programming the data E2PROM through In-Application Programming (IAP). The third slave writes the command byte and other data in the RAM and generates an interrupt signal. The micro controller then decodes the command and processes the data as decoded from the command byte. The micro controller also writes a status byte in the RAM, which the addressing master can poll.

Each slave has its own RAM buffer at a fixed location in the RAM area of the micro controller. Slaves 1 and 2 have 256-byte buffers that can be individually protected from I2C master write accesses. Slave 3 has a 256-byte RAM buffer without write protection feature. All three slaves have individual read status flags and write status flags with maskable interrupts. These status flags are set when the I2C master has completed a read or write operation.

Current address register (ADDRESS REGISTER 210) stores the offset address of the respective slave buffer. This register always points to last address accessed plus one. The MSB bits are masked according to the size of the buffer. If the byte address sent by the master is above the actual size of the buffer then the current address just rolls over. For instance if the buffer size is 128 units and byte address sent by master is 129 units, then current address register will hold the value of 01. Byte count register indicates the number of bytes transferred by any of the slaves. These register increment for each byte received or transmitted.

To allow emulation of standard serial memory devices, pages can be defined in the RAM buffer. The pages are configured using the page length configurations bits in the control register, e.g., control registers 224 and 226. Eight/Sixteen byte page length has to be selected depending on the serial memory to emulate. The full-page option is to be used when no paging of the RAM buffer is required. The full-page configuration corresponds to 256 bytes. Paging affects the handling of rollover when write operations are performed. In case the bottom of the page is reached, the write continues from the first address of the same page. Page length does not affect read operations and rollover is done on the whole RAM buffer regardless of the configured page length. The byte count register is reset when it reaches 256 bytes, irrespective of the page length.

Write protection feature is provided by the system, so that the CPU can disable this peripheral from writing into the respective RAM buffers. As the name suggests, it is applicable only for write operations. By setting the write protection control bits in control register, this feature can be enabled to protect the RAM buffer of the first or second slave against write access from the master. When a slave is write protected, based on the control bit configuration, the slave can decide to send a acknowledgement to master. In an attempt to effectuate a write operation, if the control bit is configured to send an acknowledgement to master when write protection is enabled, the slave address gets acknowledged, the current address register gets overwritten and data is also acknowledged but it is not written to the RAM. Both the current address and byte count registers are incremented in normal operation.

The slave address does not get acknowledged if the control bit is configured to send a non-acknowledgement signal to the master when write protection is enabled and when a write operation is attempted.

In case of write access to a write protected address, no status flags are set and hence no interrupt is generated. Only write operations are disabled/enabled. The read operations remain unaffected.

The RAM buffer of each slave is divided into pages, whose length is defined according to page length configuration in control register. Rollover takes place in these pages as described below:

In the case of a Page Write operation, if the number of data bytes transmitted is more than the page length, the current address will roll over to the first byte of the current page and the previous data will be overwritten. This page size is configured using Page length configuration in the control register.

In case of Sequential Read operation, if the current address register value reaches the memory address limit the address will roll over to the first address of the reserved area for the respective slave. Note that the page boundaries are pre-defined. For instance, the 8-byte page boundary is based on masking the upper 5 bits—thus if a 3-byte 'page write' is begun on register address 0x0C, the locations written would be 0x0C, 0x0D, 0x0E, 0x0F and 0x08. The 16-byte page configuration also operates in the same manner.

Conventional data communication systems are easily induced with errors. To manage problems during communication, error-handling mechanisms are implemented. Bus error occurs when a misplaced start or stop is detected during receive or transmit sequence of data. The bus error flag is set in the status register 228 and an interrupt is generated as a consequence. On detecting a misplaced STOP condition, the slave releases the SDA and SCL line high and aborts the communication. On detecting a misplaced START condition, the slave releases the SDA and SCL line high such that it anticipates the sending of a slave address. The bus error flag in the Status Register 228 is set as soon as a misplaced start or stop is detected.

If there is an interruption in protocol a power loss or system reset on the master side, then the master would clock up to nine cycles and would look for SDA high in each cycle and then restart a new communication. The slave would see this case if a non-acknowledge is received which is not immediately followed by a stop signal. On such a condition on the bus, the non-acknowledgement flag in the Status Register will be set. On reception of a new start condition, normal functioning will resume.

Figure 3:
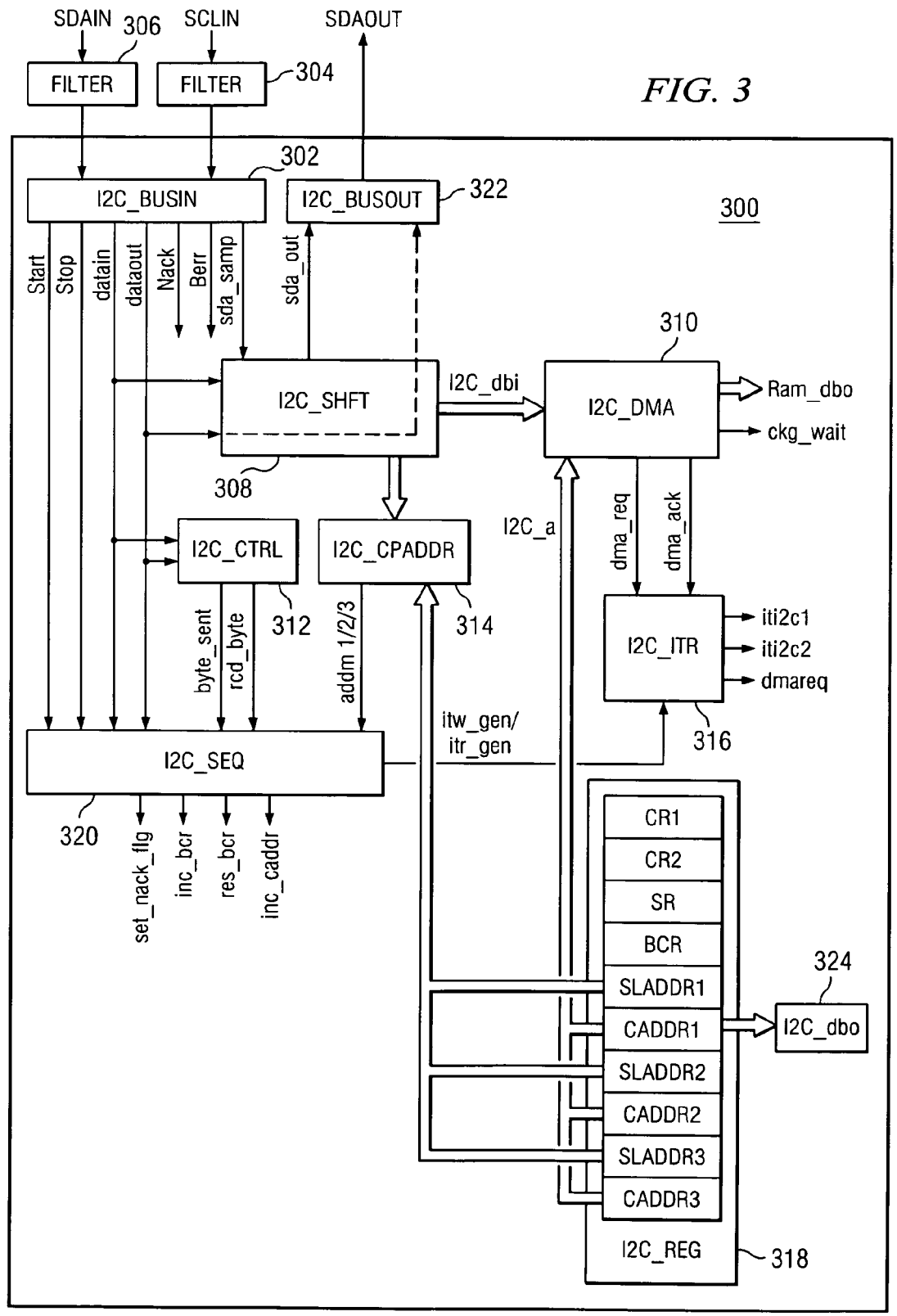
FIG. 3 illustrates the internal block diagram of the macrocell that explains the internal blocks and various internal events of the macrocell in accordance with one embodiment of the present disclosure.

FIG. 3 illustrates the block diagram of the system that emulates I2C triple slave communication for multi-buffer interface. The I2C_BUSIN block 302 serves the purpose of detecting conditions on the bus like start, stop, acknowledge, non acknowledge and bus error. Rising edge of the serial clock SCLIN, received via filter 304, is detected (datain) for sampling data on SDAIN, received via filter 306, and falling edge of SCL is detected (dataout) to release data on SDAOUT. Apart from the primary clock Ck, SDAIN and SCLIN are also used as clock to some flops used for start/stop detection in this block, and can function an signal synchronization and detection means. SDAIN and SCLIN both have been synchronized twice at the rising edge of Ck to eliminate any metastability. I2C_SHIFT block 308 contains the shift register, data register and an auxiliary data register, and can function as a shifting means for receiving and retaining data received. Shift Register is mainly to shift in/out data to/from SDA line via I2C_Busout 322. The data register holds the data read from the RAM by the DMA 310 or the data to be written to the RAM by the DMA 310. The auxiliary data register is used only for read of RAM. The I2C_CTRL block 312 control signal module provides control signals for the I2C_SHFT block 308, and can function as a control signal generation means. It generates the write signals for Data Register→ Shift Register, Auxiliary Data Register → Shift Register and Shift Register → Data Register. It maintains a count of the bits being shifted in or out and generates control signals byte_sent and rcd_byte after transmission and reception of a byte respectively. I2C_CPADDR block 314 compares the received slave address with the three slave address registers, also referred to as three storage areas, if the respective slaves are enabled, and can function as a comparing means. It generates the address-matched signal addm 1/2/3 for the state machine and other blocks. The I2C_ITR block 316 generates the DMA access request signal dmareq and Interrupt signals iti2c1 and iti2c2. DMA request depends on control signals from the state machine and acknowledgement received from the DMA block. Interrupts depend on the Read/Write flags and the respective interrupt enable signals and control signals from the state machine. I2C_REG block 318 contains all the I2C slave registers, including three slave address storage areas SLADDR1, SLADDR2, and SLADDR3, and three current address registers CADDR1, CADDR2, and CADDR3, and interfaces with a plurality of data buffers, shown as I2C_dbo 324, and can functions as a sequencing means. The control signals for updating the status of the Byte count register, Status register, Current address registers are provided by the state machine. I2C_SEQ block 320 contains a state machine, which makes the macrocell to behave in a particular sequence. I2C_DMA block 310 is the DMA controller, also called a direct storage access controller, which helps fast access of I2C to the ram. This block has the I2C_DMACTRL controller, which generates the wait signal for the clock generator and it multiplexes the data from the core and the I2C depending on the DMA request. A read delay signal also causes two access of the memory in case of read.

Figure 4:
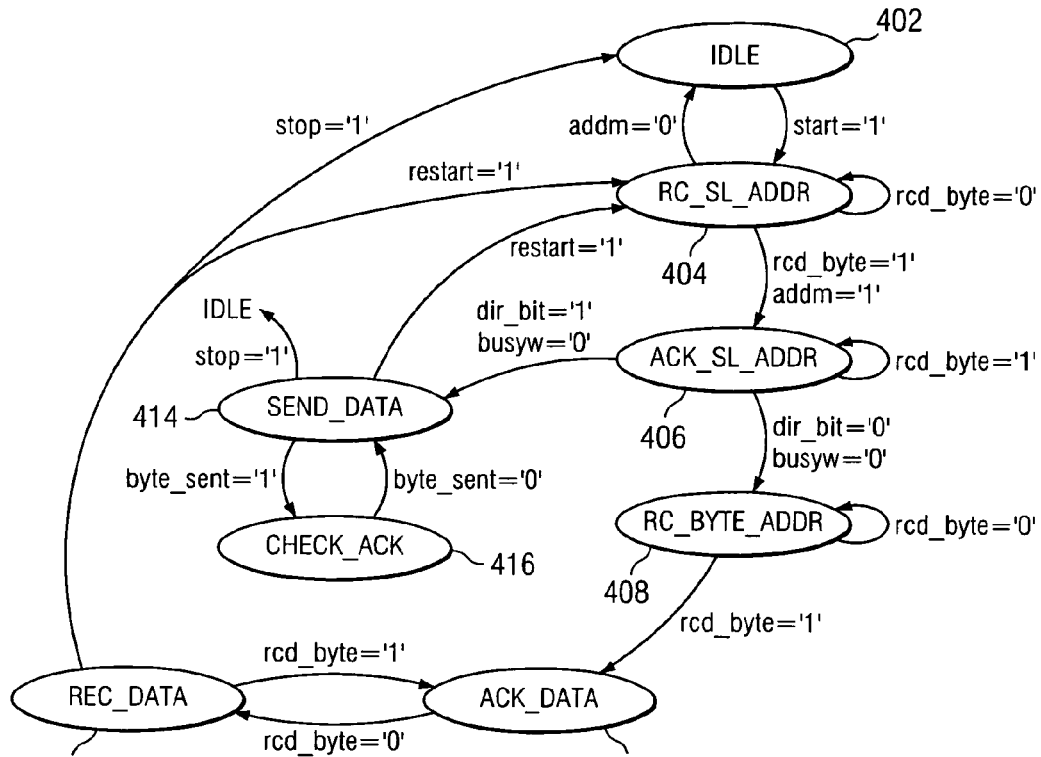
FIG. 4 illustrates the state machines diagram of the macrocell that explains the internal events and their sequences according to one embodiment of the present disclosure.

FIG. 4 illustrates the state machines of the system. When the communication is not taking place, the state machine resides in the IDLE state 402. As soon as a start condition is detected it moves on to the next state RC_SL_ADDR 404. The following events take place in RC_SL_ADDR 404 state. A seven bit slave address is shifted in serially at each rising edge of the SCL along with the direction bit. Address is compared to all the three slave addresses and it is compared only if the BusyW flag has been reset.

If address does not match next state is IDLE, and

If slave address matches, the Byte count register is reset.

ACK_SL_ADDR 406 state is reached when acknowledge is sent to the Master. In this state, if the signal dir_bit='0', the next state is RC_BYTE_ADDR 408. If dir_bit='1' next state is SEND_DATA.

In RC_BYTE_ADDR 408 state, slave receives 8 bit Byte Address. If byte reception is complete then the next state is ACK_DATA 410. The state ACK_DATA 410 signifies the acknowledgement of data followed by a next state, which is REC_DATA 412.

The state REC_DATA 412 signifies the receipt of eight bit data. After reception of eight bit data, the next state is ACK_DATA 410. If stop is detected, then the next state is IDLE 402. If a restart state is detected, then the next state is RC_SL_ADDR 404.

The state SEND_DATA 414 generates a DMA request and reads data from the offset address pointed by current address register and then sends the eight bit data to the data processing and retaining device.

If byte_sent='1' then next state is CHECK_ACK 416.

If a Stop condition is detected the next state is IDLE 402.

If a Restart condition is detected, next state is RC_SL_ADDR 404. CHECK_ACK 416 checks for acknowledge from the master. Next state is SEND_DATA.

Figure 5:
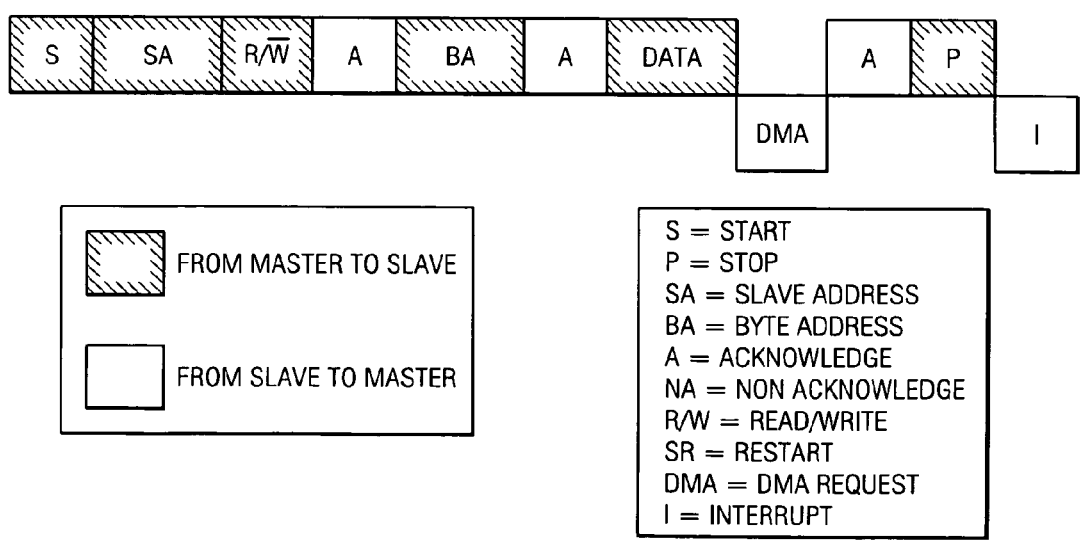
FIG. 5 illustrates the byte write protocol in accordance with one embodiment of the present disclosure.

The bit-wise sequence of operation of the multiple buffer access the data retaining device is explained as below:

FIG. 5 illustrates the Byte Write protocol wherein the Slave address is followed by an eight-bit byte address. Upon receipt of this address an acknowledgement is generated and the address is moved into the Current Address Register. Further, the eight bit data is clocked in. Once the data is shifted in, a DMA request is generated and the data is written in the RAM. The addressing device will terminate the write sequence with a stop condition as illustrated by FIG. 6.

Figure 6:
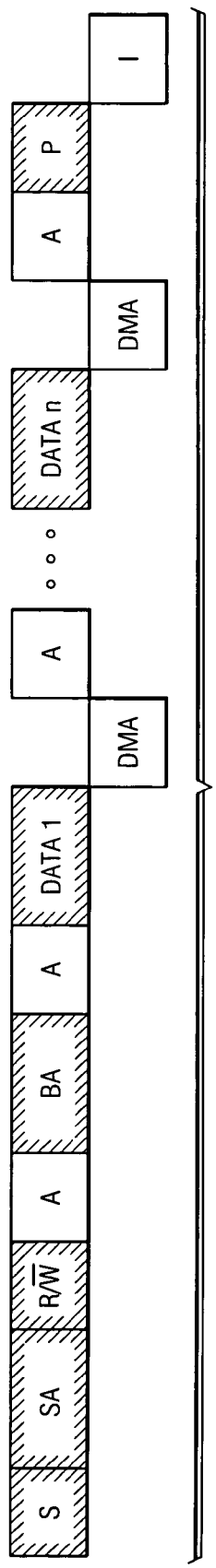
FIG. 6 illustrates the page write protocol in accordance with one embodiment of the present disclosure.
Figure 7:
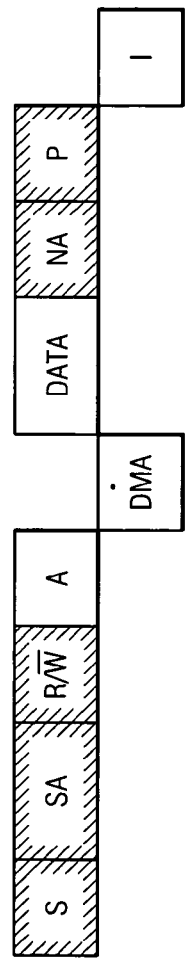
FIG. 7 illustrates the current address read protocol according to the instant disclosure.

FIG. 6 shows that a page write is initiated in similar way to a byte write, but the addressing device does not send a stop condition after the first data byte. The page length is programmed using page length configuration bits in the Control Register. The current address register value is incremented by one every time a byte is written. When this address reaches the page boundary, the next byte will be written at the beginning of the same page as illustrated by FIG. 7.

Figure 8:
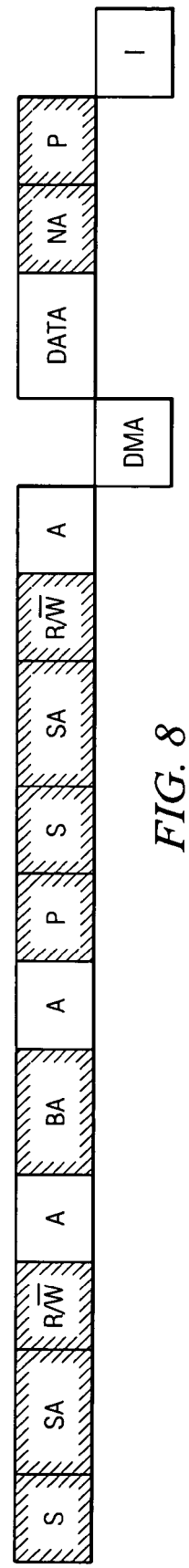
FIG. 8 illustrates the random read protocol in accordance with one embodiment of the present disclosure.
Figure 9:
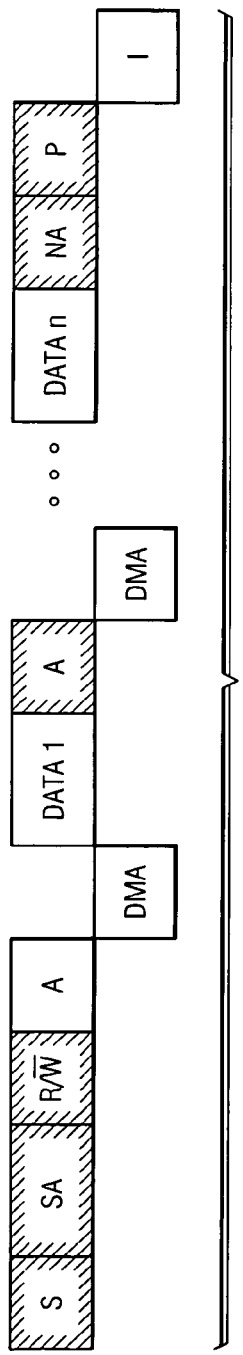
FIG. 9 illustrates the sequential read protocol according to one embodiment of the present disclosure.

The current address register maintains the last address accessed during the last read or write operation incremented by one. During this operation the I2C slave reads the data pointed by the current address register as shown in FIG. 8. Random read requires a dummy byte write sequence to load in the byte address. The addressing device then generates restart condition and resends the device address similar to current address read with the read/write bit high. Refer to FIG. 9. Some types of I2C masters perform a dummy write with a stop condition and then a current address read. In either case, the slave generates a DMA request, sends an acknowledgement and serially clocks out the data. When the memory address limit is reached the current address will roll over and the random read will continue till the addressing master sends a stop condition.

FIG. 9 shows that the Sequential reads are initiated by either a current address read or a random address read. After the addressing master receives the data byte it responds with an acknowledgement signal. As long as the slave receives an acknowledge signal it will continue to increment the current address register and clock out sequential data bytes.

Figure 10:
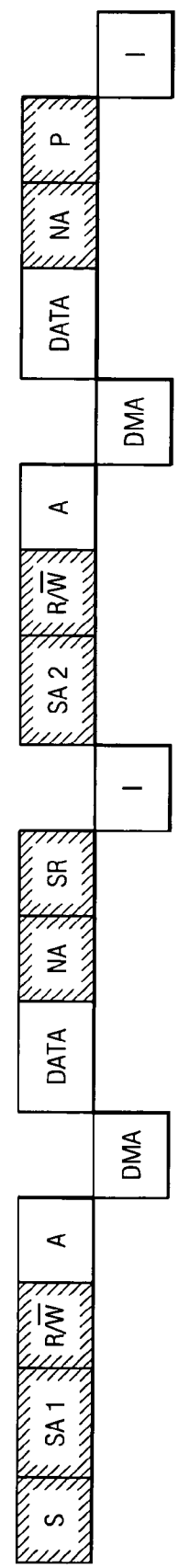
FIG. 10 illustrates the combined format protocol in accordance with one embodiment of the present disclosure.

FIG. 10 illustrates that when the memory address limit is reached the current address will roll over and the sequential read will continue till the addressing master sends a stop condition.

If a master wants to continue communication either with another slave or by changing the direction of transfer then the master would generate a restart and provide a different slave address or the same slave address with the R/W bit reversed.

It is intended that the present disclosure encompass such changes and modifications as falling within the scope of the appended claims.

What is claimed is:

1. An area efficient system for providing serial access of multiple data buffers to a data retaining and processing device, comprising:

a signal synchronization and detection means operable to synchronize a clock signal and a data signal, said data signal being used with said clock signal for generating status signals on a data bus;

a shift register operable to receive and retain data received from said data bus and to generate:

a status signal indicating the receipt of data by said area efficient system;

a reference bus address; and said data for enabling direct storage access;

a comparator operably coupled to at least three storage areas to compare said reference bus address with the content of said storage areas to generate an address matching signal;

a control signal module connected and operable to govern a data write signal generation for said shift register responsive to said data bus;

a sequencer to read data from said data retaining and processing device and writing data to said data retaining and processing device in a plurality of sub-cycles responsive to said status signals, data bus, address matching signal, and said reference bus address;

a direct storage access controller operably coupled to at least three address registers, said address registers connected to communicate with said multiple data buffers, for enabling data read and write operation of said data retaining and processing device, receiving signals from said shift register for enabling speed efficient access of said data bus to said data retaining and processing device and receiving control signal from said sequencer for generating interrupt signals and access request signals for said data retaining and processing device; and said serial access of multiple data buffers being performed according to the inter-integrated circuit data transfer protocol.

2. The system of claim 1, wherein said status signals further comprise at least one of:
 a data transfer commencement signal;
 a data transfer completion signal;
 an acknowledgement signal;
 a bus error detection signal; and
 a data sampling signal.

3. The system of claim 1, wherein said data retaining and processing device is a micro controller.

4. The system of claim 1, wherein said data retaining and processing device is a microprocessor.

5. The system of claim 1, wherein said signal synchronization and detection means comprises:
 a filter connected to receive the clock signal; and
 a data bus operations detector coupled to said filter and said data bus.

6. The system of claim 1, wherein said control signal module generates write signals for writes between the shift register and at least one data register.

7. The system of claim 1, wherein said sequencer comprises a state machine.

8. The system of claim 1, wherein said direct storage access controller comprises:
 a direct memory access controller; and
 an interrupt signal generation means for generating at least one interrupt signal and at least one access request signal.

9. A microcontroller containing a plurality of macrocells, each macrocell comprising:
 a signal synchronization and detection means operable to synchronize a clock signal and a data signal, said data signal being used with said clock signal for generating status signals on a data bus;

a shift register operable to receive and retain data received from said data bus and to generate:

a status signal indicating the receipt of data by said area efficient system;

a reference bus address; and said data for enabling direct storage access;

a comparator operably coupled to at least three storage areas to compare said reference bus address with the content of said storage areas to generate an address matching signal;

a control signal module connected and operable to govern a data write signal generation for said shift register responsive to said data bus;

a sequencer to read data from said data retaining and processing device and writing data to said data retaining and processing device in a plurality of sub-cycles responsive to said status signals data bus, address matching signal, and said reference bus address;

a direct storage access controller operably coupled to at least three address registers, said address registers connected to communicate with said multiple data buffers, for enabling data read and write operation of said data retaining and processing device, receiving signals from said shift register for enabling speed efficient access of said data bus to said data retaining and processing device and receiving control signal from said sequencer for generating interrupt signals and access request signals for said data retaining and processing device; and said serial access of multiple data buffers being performed according to the inter-integrated circuit data transfer protocol.

10. The microcontroller of claim 9, wherein said status signals further comprise at least one of:
 a data transfer commencement signal;
 a data transfer completion signal;
 an acknowledgement signal;
 a bus error detection signal; and
 a data sampling signal.

11. The microcontroller of claim 9, wherein said data retaining and processing device is a micro controller.

12. The microcontroller of claim 9, wherein said data retaining and processing device is a microprocessor.

13. The microcontroller of claim 9, wherein said signal synchronization and detection means comprises:
 a filter connected to receive the clock signal; and
 a data bus operations detector coupled to said filter and said data bus.

14. The microcontroller of claim 9, wherein said control signal module generates write signals for writes between the shift register and at least one data register.

15. The microcontroller of claim 9, wherein said sequencer comprises a state machine.

16. The microcontroller of claim 9, wherein said direct storage access controller comprises:
 a direct memory access controller; and
 an interrupt signal generation means for generating at least one interrupt signal and at least one access request signal.

17. A method of providing serial access of multiple data buffers to a data retaining and processing device, the method comprising:
 synchronizing a clock signal and a data signal, said data signal being used with said clock signal for generating status signals on a data bus;

receiving and retaining data received from said data bus and to generate:
a status signal indicating the receipt of data by said area efficient system;
a reference bus address; and
said data for enabling direct storage access;
in at least three storage areas, comparing said reference bus address with the content of said storage areas to generate an address matching signal;
generating a data write signal for said shift register responsive to said data bus;
reading data from said data retaining and processing device and writing data to said data retaining and processing device in a plurality of sub-cycles responsive to said status signals, data bus, address matching signal, and said reference bus address;
in at least three address registers, said address registers connected to communicate with said multiple data buffers, enabling data read and write operation of said data retaining and processing device, receiving signals from said shift register for enabling speed efficient access of said data bus to said data retaining and processing device and receiving control signal from said sequencer for generating interrupt signals and access request signals for said data retaining and processing device; and
said serial access of multiple data buffers being performed according to the inter-integrated circuit data transfer protocol.

* * * * *